Fig. 2.

INVENTOR
JOHN W. MYERS,
By Bruce S. Elliott
ATTORNEY

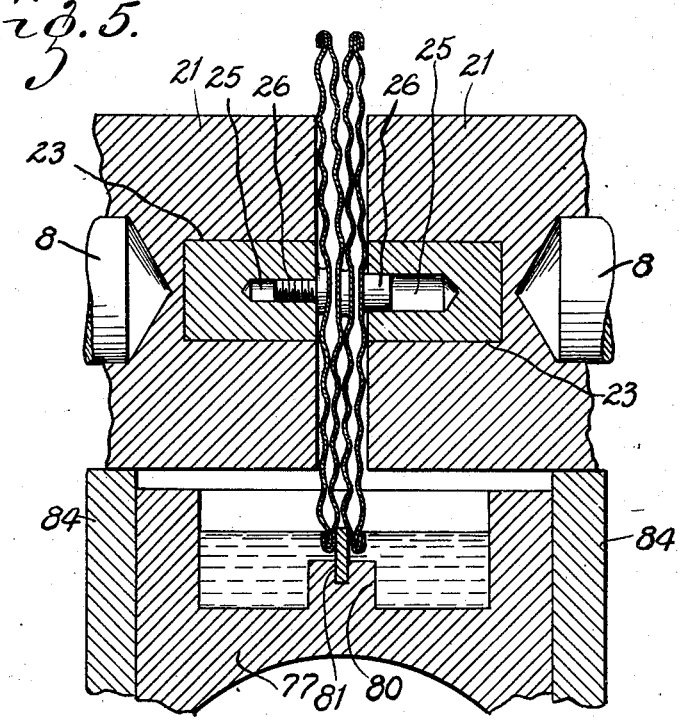
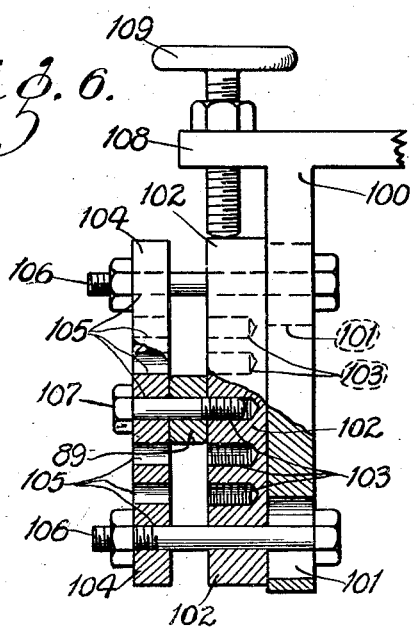

Patented May 24, 1932

1,860,048

UNITED STATES PATENT OFFICE

JOHN W. MYERS, OF QUINCY, ILLINOIS

MACHINE FOR SOLDERING WAFER THERMOSTATS

Application filed November 4, 1929. Serial No. 404,795.

This invention relates to a novel machine for soldering the circumferential edge portions of what are known in the trade as "wafers", each of which is formed of two circular disks of expansible metal having their edges united to form a hollow chamber for containing ether or other volatile liquid, one or more of said wafers being united to form a thermostatic unit, which are commonly employed to regulate the temperature in incubators.

Heretofore, so far as my knowledge extends, the soldering of the two disks of the wafer has been performed by hand, the process requiring a considerable degree of skill on the part of the mechanic and the expenditure of a relatively large amount of time, with the resultant high cost of production.

It is the general object of the present invention to provide a machine which will operate in a rapid and reliable manner to continuously solder the edges of thermostatic wafers which may be fed to the machine by unskilled labor, with the result of enormously increasing the out-put of these wafers and at the same time, greatly reducing the cost thereof.

My improved machine is characterized by a number of carriers mounted on endless conveyors, each carrier being adapted to have a wafer inserted in holders provided thereby at one end of the machine and to have the wafer automatically discharged therefrom at the opposite end; by the provision of an acid tank and a solder tank, with means for guiding the wafers through the tanks at the proper depth of submergence in the acid and solder, respectively; by the provision of means for maintaining the two wafers, constituting a thermostatic unit, in separated relation during the progress of the thermostat through the machine and up to the point of its discharge therefrom; by the provision of automatic means for separating the holders of each carrier as it reaches the remote end of the machine; by the provision of stripping mechanism for insuring the removal of the thermostat from the holders as the latter are opened; by the provision of novel means for maintaining a desired depth of acid in the acid tank; by the provision of means for adjusting the height of the acid and solder tanks; and by the provision of an air blast apparatus located at the remote or rear end of the machine for cooling the solder of each wafer and thereby expediting the hardening thereof as the thermostat emerges from the soldering tank.

Various novel constructions, combinations, and arrangements of parts also enter into the objects of the invention, and these will be more clearly understood from the detailed description of the invention to follow.

In the accompanying drawings—

Figure 2 is a plan view thereof, a portion of one of the carriers being removed to show the carrier chain construction;

Figure 5 is a view on an enlarged scale showing a thermostat in cross-section held in position between two holders of a carrier;

Figure 6 is a view in side elevation taken from Fig. 1 showing the holding and adjusting mechanism for the lever which controls the height of the acid and solder tanks.

Figure 1:
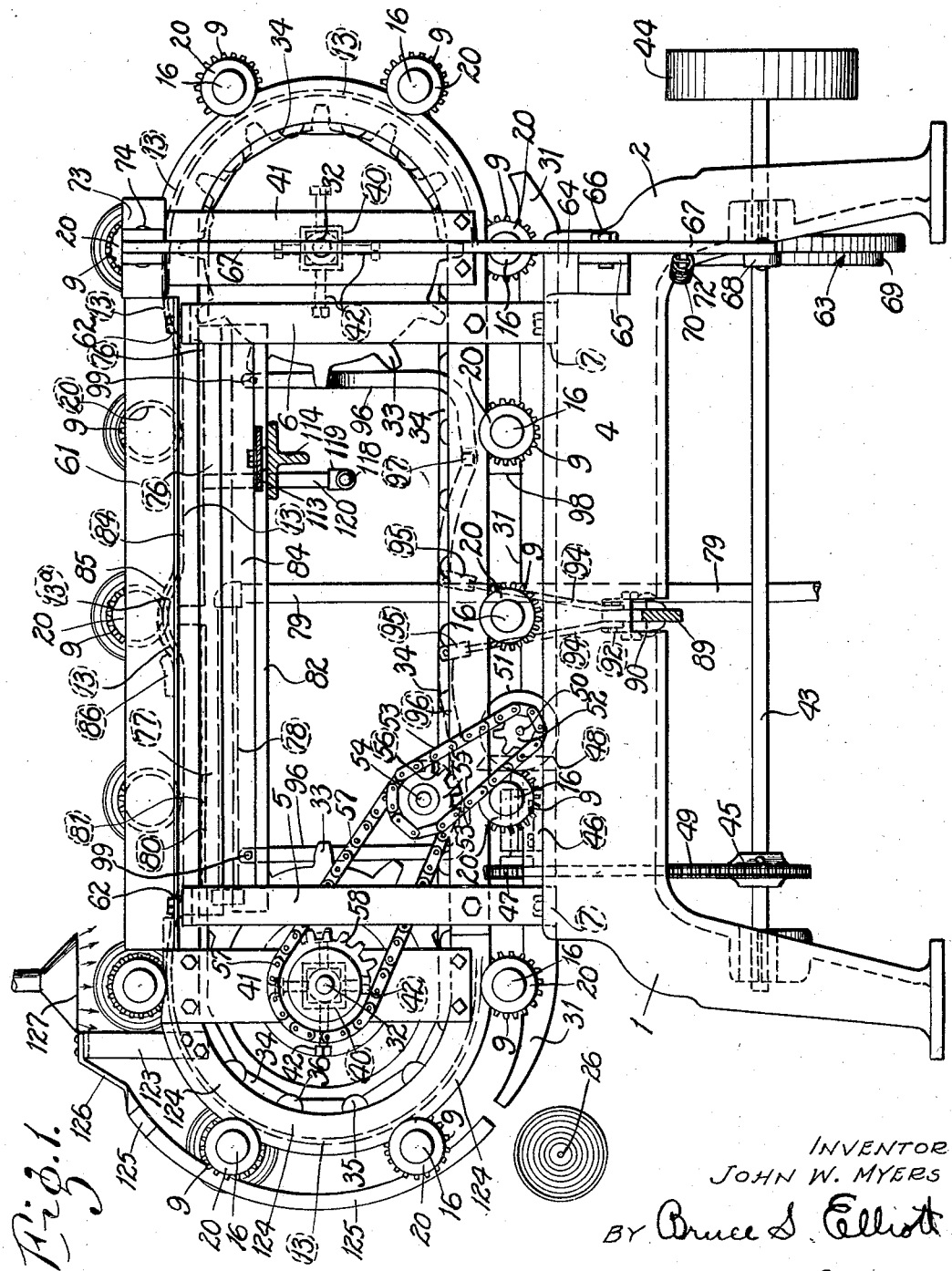
Figure 1 is a view in side elevation of my improved machine.

Referring now to the drawings, the numerals 1, 2, indicate the end standards of a base for the machine, which are connected by side frame members 3, 4. Mounted on each side of the base at each end thereof and projecting upwardly therefrom are vertical frame members 5, 6, which are connected by transverse frame members 7. Only sufficient of the frame of the machine is described at this point to assist in the location of the parts. Other frame members may be referred to later on as occasion requires. For moving the wafers over the machine and through the acid and soldering tanks, I employ a series of carriers mounted on endless chain conveyors and the description of one of these carriers and of the means for moving the same will now be given, referring particularly to Figs. 2, 3, and 4.

The numerals 8 indicate two shafts which are arranged in abutting relation at their inner ends, and each of which has slidably mounted near its outer end a pinion 9 having a hub 10. Each shaft 8 is provided with a groove 11 and each of the hubs 10 is provided with a pin 12 the inner end of which engages in the groove. Each of the pinions 10 is adapted to engage the teeth of a rack bar 13 which, as shown, is continuous, extending over the front of the machine around the ends thereof and along the underside of the machine. The rack bar 13 is provided with a central longitudinal groove containing the rack teeth and providing projections 14 on either side of the pinion, whereby to guide the pinion in its travel around the machine while causing it to be rotated. By slidably mounting the pinions 10 on the shafts 8, they are permitted to slide on said shafts to accommodate themselves to any slight departures on the part of the rack bars 13 from a right line. This arrangement, however, has for its principal purpose to permit longitudinal movement of the shafts 8 through the pinions, as will be later described. Each of the shafts 8 is provided on its outer end with a circumferential groove 15, and slidably mounted on this outer end is a head 16 provided with a central recess 17 opening from its inner end in which is housed a coil spring 18 which bears against the outer end of shaft 8. Secured in the wall of the head 16 is a pin 19 which projects into the recess 17, its inner end engaging in the circumferential groove 15 of the shaft. The head 16 is provided with a circumferential flange 20 for a purpose to be presently described, and the head as a whole is slidably and rotatably mounted on the end of the shaft 8. Mounted on the opposite or inner end of each of the shafts 8 is a holder 21 which is secured by a screw or the like 22 to the shaft so as to rotate therewith. Each of the holders 21 is provided centrally of its inner end portion with a recess 23 which is adapted to house a chuck 24 for retaining and centering the wafers in the holder. A series of interchangeable chucks is provided for each holder and each of these chucks is provided with a recess 25 the size of which is proportioned to fit the style and size of a post 26 (Fig. 5) on the thermostat being soldered. As shown in Fig. 5, the holders on the two shafts 8 of each carrier are opposed to each other so that the posts 26 which are located centrally of the outer side of each of the wafers or thermostatic units, will be received and centered in each carrier and will be rotated by the shafts 8 through the medium of the pinions 9 engaging with the rack bar 13 as the carriers are moved over the machine.

Each of the shafts 8 is rotatably mounted in two spaced bearings 27 which are bolted to a bed-plate 28 at opposite sides thereof, and each of which is provided with a bearing slot 29 elongated vertically, as shown, to permit the shaft 8 to have vertical movement in said bearings. Rotatably mounted on shaft 8 between the bearings 27 is a roller 30. Extending under the machine from end to end and at each side thereof are two pressure bars 31 (Figs. 1 and 3), the ends of which at the rear end of the machine are curved upwardly. As each carrier passes around the rear end of the machine and is moved toward the front end of the machine, the rollers 30 thereof pass onto the upper edges of the pressure bars 31 which act to hold the pinions 9 in engagement with the teeth on the underside of the rack bars 13 which would otherwise fall out of engagement therewith due to the sag of the carrier chains by means of which the carriers are continuously moved over the top of the machine from front to rear thereof, and under the machine from the rear to the front thereof, as will now be described.

Figure 2:
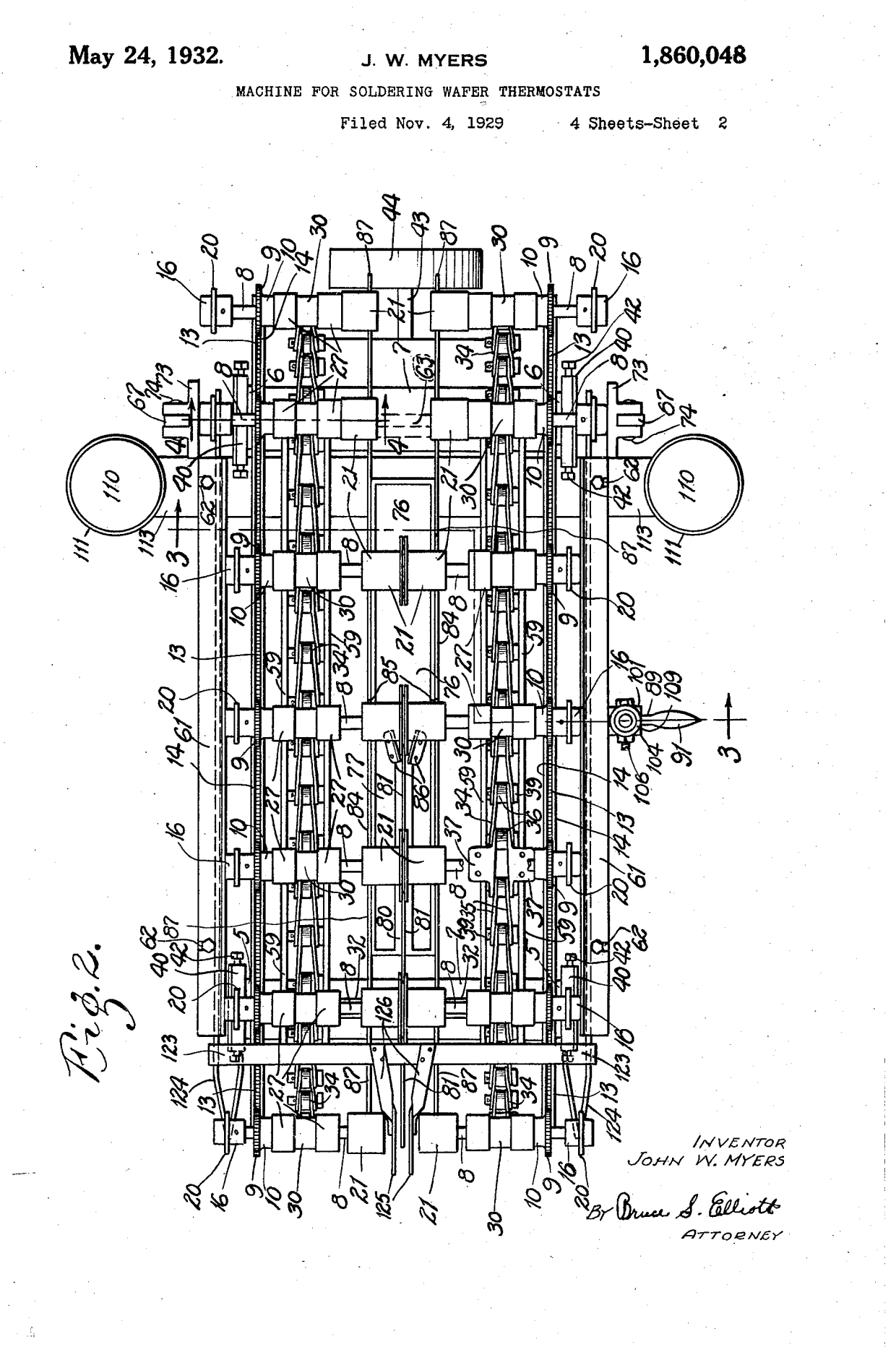

Extending transversely of the machine at each end thereof is a shaft 32 (Figs. 1 and 3) on each of which is mounted at opposite sides of the machine, respectively, sprocket wheels 33, and over corresponding sprocket wheels at each side of the machine passes a sprocket chain 34 (Figs. 1 and 2). This carrier chain is constructed of links 35 and rollers 36 and every third link is provided on each side with a flange 37 (Figs. 2, 3, and 4), which flanges are secured to the bed-plate 28 by the same bolts 38 which secure the bed-plate to the bearings 27. The links of the chain are pivotally united by means of bolts 39. Each of the shafts 32 is mounted in a box bearing 40 (Fig. 1), mounted on vertical frame members 41 and by means of set-screws 42, the bearings may be adjusted both vertically and horizontally to secure the proper alinement of the shafts 32. For driving the sprocket wheels 33 and sprocket chains 34, I provide the following driving mechanism:

Extending longitudinally of the machine and mounted in bearings on the standards 1 and 2 is a main drive shaft 43 having on one end a drive pulley 44 by means of which the pulley and shaft may be rotated in the usual manner by a belt (not shown). Secured on the shaft 43 near the rear end thereof is a sprocket 45 (Fig. 1). Mounted on the base of the machine above the shaft 43 is a bearing 46 in which is housed a short shaft having on one end a sprocket 47 and on the other, a bevel gear 48. A sprocket chain 49 passes over the sprockets 45 and 47 so that when the shaft 43 is rotated, the bevel gear 48 will be driven through the medium of sprockets 45 and 47 and sprocket chain 49. Mounted to extend transversely of the machine is a shaft 50 having intermediate its ends a bevel gear 51 in mesh with the bevel gear 48. The shaft 50 extends from side to side of the machine and has on each end a sprocket 52 over which passes a sprocket chain 53. A second transverse shaft 54 has mounted thereon a sprocket 55 over which passes the other end of the sprocket chain 53. Mounted on each end of shaft 54 is a sprocket 56 over which passes one end of a sprocket chain 57, the two sprocket chains 57 passing over corresponding sprockets 58 located, respectively, on opposite ends of shaft 32. By the driving mechanism described, it will be seen that as the shaft 43 is rotated, the carrier chains 35 will be caused to travel, as to their upper run, from the front to the rear of the machine, and then under the machine back to the front end thereof. In its travel over the top of the machine, each of the sprocket chains 34 is guided by parallel flanges 59 (Fig. 4) standing upward from a base 60, the opposite ends of each of the bolts 39 of said sprocket chains engaging the inner sides of said flanges, as clearly shown.

Figure 3:
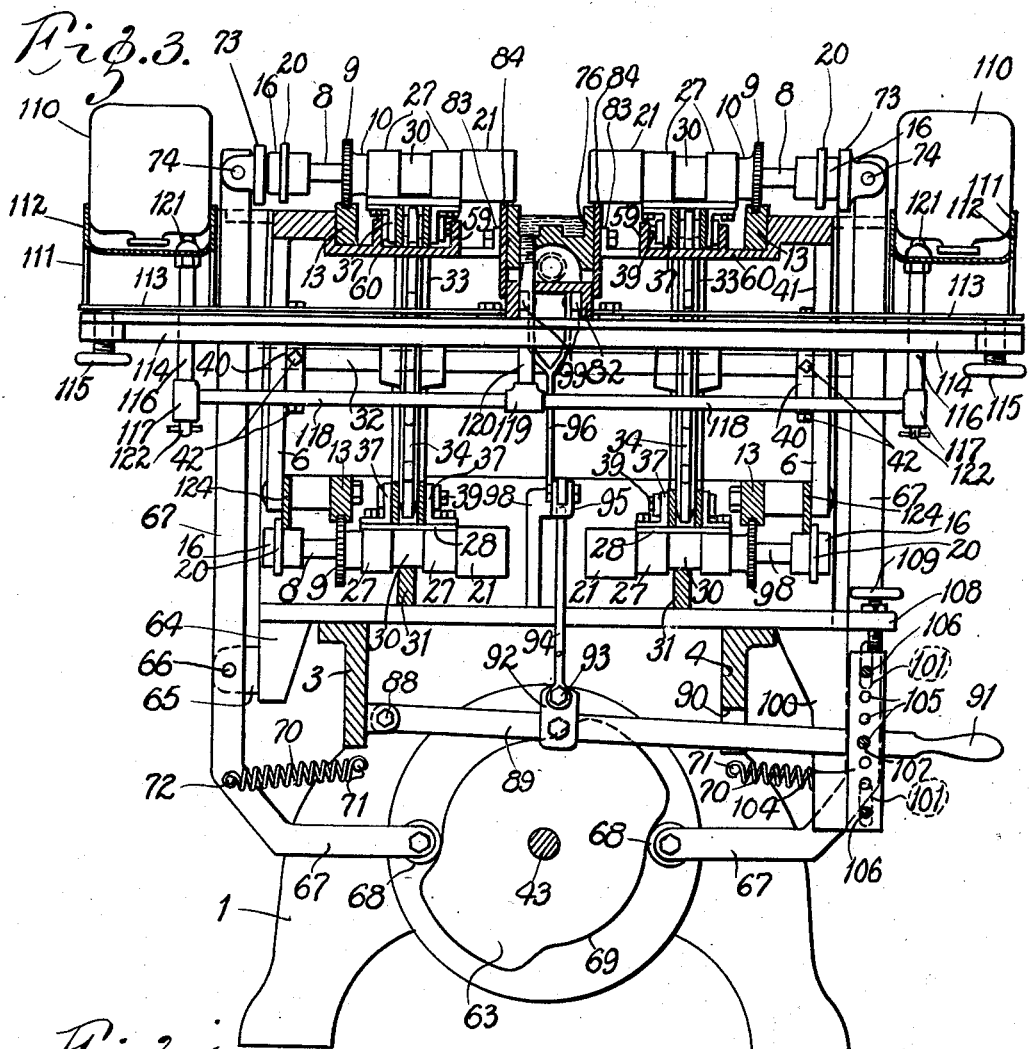
Figure 3 is a cross-sectional view on the line 3—3 of Fig. 2.
Figure 4:
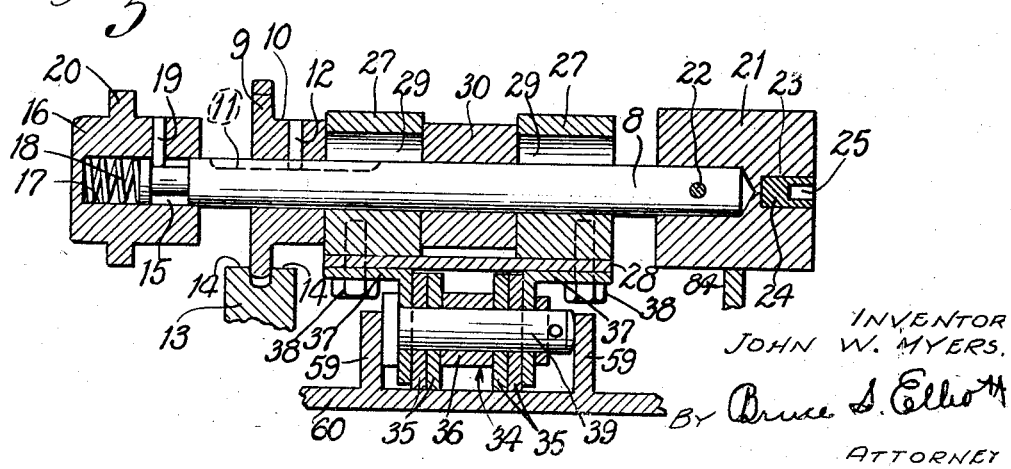
Figure 4 is a cross-section on an enlarged scale through one of the carriers, taken on the line 4—4 of Fig. 1 and viewed in the direction of the arrow.

The purpose of the heads 16 and coil springs 18 (Fig. 4) is to enable the proper pressure to be exerted on shafts 8 to force the holders 21 into engagement with the wafers, to cause them to rotate with said shafts in the passage of the carriers over the machine and at the same time to permit the shafts 8 to yield to accommodate wafers varying in thickness. In order to cause the heads 16 to exert pressure upon the coil springs 18, I provide on opposite sides of the machine two pressure bars 61 (Fig. 2) which are adjustable toward and from each other by an ordinary bolt and slot connection, as indicated at 62, and between and in engagement with which the heads 16 of each carrier are adapted to move in the passage of the carriers over the machine. In order to automatically force the holders 21 into engagement with the wafers and at the same time move the heads 16 inward so that they will pass between the pressure bars 61, I provide the following mechanism:

Mounted on the shaft 43 is a double cam 63 (Figs. 1 and 3). Depending from the transverse frame member 7 at the front end of the machine and at opposite sides thereof, as shown at the right in Fig. 1 and in Fig. 3, are brackets 64 having laterally projecting ears 65 on each of which is pivotally mounted at 66 an actuating lever 67. The lower end of each actuating lever extends inward at right angles and is provided with a roller 68, which rollers are held in engagement with the cam surface 69 of cam 63 by means of coil springs 70, one end of which is secured to the base of the machine, as shown at 71, and the other end to the actuating lever 67 below the pivotal connection 66 thereof, as shown at 72. For the major portion of their length the actuating levers 67 have a vertical extension and at their upper ends are provided with pressure plates 73 which are pivotally mounted on the actuating levers, as indicated at 74. These pressure plates are pivoted to allow a free up-and-down movement to enable them to engage the ends of the heads 16 flatwise as the upper ends of the actuating levers 67 are thrown inward by the action of cam 63.

In the operation of this part of the machine, a wafer is placed in position between the holders 21 by inserting one or the other of the posts 75 (Fig. 5) in chuck 24 in one of the heads 21 and as the cam 63 rotates and forces the rollers 68 outward, the actuating levers 67 will move the pressure plates 73 into engagement with two opposite heads 16 of a carrier and force the shafts 8 inward, thereby causing the holders 21 to yieldingly engage opposite sides of the wafer. At the same time the carrier is being moved forward while in engagement with the pressure plates 73, and this relation of the parts continues until the outer sides or faces of the heads 16 pass between the pressure bars 61 and into engagement with the inner sides thereof. In practice, when the pressure plates 73 are forced inward, as above described, their inner faces will be brought substantially flush with the inner faces of the pressure bars 61. As the rollers 68 move into the lower part of the cam, the springs 70 pull the lower ends of actuating levers 67 inward, thereby moving the pressure plates 73 outward to positions to engage the ends of the next carrier.

In the operation of soldering a wafer, the marginal portion of the latter is first passed through the acid tank, then raised out of the acid tank and passed through the soldering tank; while passing through the soldering tank solder is prevented from filling the space between the inner sides of adjacent wafers and thus soldering them together, and at the rear end of the tank mechanism is provided for automatically releasing the holders from engagement with the thermostatic unit, and the latter discharged from the machine. The devices entering into the performance of these operations will now be described in order.

Referring to Figs. 1 and 2, the numeral 76 indicates an acid tank, and the numeral 77 a solder tank, these tanks being shallow and rectangular in shape and their inner ends being closely adjacent to each other. Beneath the solder tank is a burner 78 which is supplied with gas from a suitable source through a pipe 79. The center of the solder tank is provided with a longitudinally extending raised portion 80 which is provided on its upper side from end to end with a groove in which is located a strip of metal 81 constituting a divider. Beneath the tanks 76 and 77 is a heavy channel iron 82 extending the full length of the tanks and upon which they rest. The support 82 is held in position by means to be later described which also enable the tanks to be raised and lowered. Each of the bases, or base plates, 60, previously referred to and shown in Figs. 3 and 4, have bracket members 83 provided on their inner sides to which are bolted guide plates 84 which embrace opposite sides of the tanks 76 and 77 so as to guide them when being vertically adjusted, as hereinafter described, and these plates project slightly above the sides of the tanks, as shown in Fig. 3, so as to form a support for the holders 21 as they move over the tanks. At the point where the inner ends of the acid and solder tanks substantially abut each other, each of the guide-plates 84 is provided with a curved raised portion 85 so that as the holders 21 pass onto this raised portion, they will be lifted to raise the thermostatic unit over the abutting ends of the acid and solder tanks, and as the holders pass off of the raised portion, they will lower said unit into the solder tank. Adjustably secured on the inner end of the acid tank, or at the entrance to the solder tank, are two centering members 86 (Figs. 1 and 2) which are separated further apart at their front than at their rear ends so that as the thermostat passes between them, if it is not exactly in line to straddle the divider 81 (Fig. 3), it will be centered by these members so that as the thermostat enters the soldering tank the two wafers thereof will be located on either side of the said divider 81. In other words, the rear ends of the centering members 86 are at equal distances from opposite sides of the divider 81 and are spaced apart a distance just sufficient to permit the thermostat to pass betwen them. The numerals 87 indicate two steel bars having curved ends extending from the front end of the acid tank 76 around the front end of the machine and continuing in straight portions extending under the machine to the rear, and then having curved portions extending over the rear end of the machine to the rear end of the solder tank 77, the ends of these bars being connected to opposite ends of the guide-plates 84. These bars act as a support for holders 21 as they pass over the machine. These bars, with the guide bars 84, substantially conform in size and shape to the rack bars 13, previously described. For supporting the acid and solder tanks and permitting of their adjustment to different heights to accommodate different sizes of thermostats or wafers, I provide the following mechanism:

Pivotally mounted at 88 (Fig. 3) on the inner side of the base frame member 3 is a lever 89 which extends through a slot 90 in the opposite side frame member 4 and beyond the side of the machine where it is provided with a handle 91 for raising and lowering it. Pivotally secured to this lever intermediate the ends thereof is a yoke member 92 to opposite sides of which are pivotally connected at 93 the lower ends of rods 94 (Figs. 1 and 3), the upper ends of which have screwthreaded connection with U-shaped clips 95 which are pivotally connected to the inner ends of two bell crank levers 96, each of which extends laterally outward from its rod 94 and then upward in a substantially vertical direction, being pivoted at 97 on the upper end of supports 98 projecting upward from the base of the machine. The upper ends of the bell crank levers 96 are bifurcated and each arm of the bifurcation is provided with a roller 99, which rollers engage the undersides of the channel iron 82 within the channel thereof. By grasping handle 91 and raising or lowering the same, the acid and solder tanks which rest on the channel iron 82 may be raised or lowered as desired. The rods 94 are provided at their lower ends with hooks which form the pivots 93 and engage in apertures in the opposite sides of yoke member 92. By removing the lower ends of these rods, or either of them, from the yoke member 92 and turning the same in one direction or the other so that the upper threaded ends will be screwed further into or out of the clips 95, the link of said rods may be adjusted to insure proper engagement of the rollers 99 with the channel iron 82 at the same level. For holding the lever 89 in adjusted positions, I provide the following arrangement:

Depending from the side frame member 4 (Figs. 3 and 6) is a bracket arm 100 provided near its upper and lower ends, respectively, with two slots 101. Slidably engaging the outer side of this bracket arm is an adjusting plate 102 which is provided on its outer face with screwthreaded openings 103. The numeral 104 indicates an anchor plate which is provided throughout the greater portion of its length with apertures 105. The anchor plate 104 is held in spaced relation to the adjusting plate 102 by means of bolts 106 which pass through slots 101 and through apertures in opposite ends of the anchor plate. The lever 89 passes between the anchor plate 104 and the adjusting plate 102 and is provided toward its outer end with an aperture through which a bolt 107 having a screwthreaded end may be passed. When the lever 89 is adjusted to the desired position, the bolt 107 is passed through one of the apertures 105 in the anchor plate 104, through the aperture in the lever 89, and its outer end is screwed into one or the other of of the screwthreaded openings 103. Extending outward from the top of the bracket arm 100 (Fig. 6) is a support 108 in which is housed an adjusting screw 109 the other end of which bears on the top of the adjusting plate 102. After the lever 89 has been secured in its adjusted position, if a still finer adjustment is required, i. e. an adjustment of said lever less than the distance between the apertures 105, this may be effected by turning the adjusting screw to move the adjusting plate 102, the lever 89 and the anchor plate 104, this movement being permitted by the sliding engagement of bolts 106 in the slots 101 of bracket arm 100.

The acid tank 76 is provided with acid from two containers 110, located on opposite sides of the machine and adapted to be supported in an up-turned position in holders 111 provided with tanks 112, each holder being mounted on the outer end of an adjusting plate 113 the inner end of which is secured on opposite sides of the channel iron 82 to a base beam 114, each of which is provided at its outer end with an adjusting screw 115 which is adapted to bear against the underside of the adjusting plate 113. By raising or lowering the adjusting screws 115, the outer ends of the adjusting plates 113 may be raised or lowered to increase or decrease the depth of acid in the tank 76. Connected to and communicating with each of the tanks 112 is a vertical pipe 116 which is connected at its lower end to a valve casing 117 with which is also connected one end of a horizontal pipe 118. At the center of the machine the pipes 118 connect to a coupling 119 from which rises a vertical pipe 120 which enters the acid tank 76 through the bottom thereof (Fig. 3). Each of the pipes 116 is provided on its upper end with a push valve 121 which is adapted to be engaged by the top of the container 110 as it is up-ended and positioned in the holder 111 so as to permit acid flowing from the container into the tank 112 to flow through pipes 116, 118 and 120 into the acid tank and be maintained at a constant level therein in a manner well known. As stated, this level may be changed by manipulating the adjusting screws 115 to raise or lower the holders 111 with their containers. Each of the valve casings 117 is provided at its lower end with a valve 122 by means of which the acid may be drained from the tanks 112 and 76 and from the pipes connecting the same when required. For separating the holders 21 to release the thermostats at the conclusion of the soldering operation, I provide the following mechanism:

Extending across the rear end of the machine over the top thereof is a supporting bar 123 (Figs. 1 and 2) the ends of which are bent downward and inward and secured to the respective rack bars 13, and secured to these rack bars by the same bolts that secure the ends of the supporting bar 123 thereto are two curved cam bars 124 which follow the general curvature of the ends of the rack bars 13 and diverge outwardly, as clearly shown by Fig. 2. As each carrier reaches the end of the machine, the annular flanges 20 on the heads 16, previously referred to (Fig. 4), engage the outer sides of the cam bars 124, with the result that in the continued outward and downward movement of the carrier the heads 16 and shafts 8 are pulled outwardly, thereby separating the holders 21. It sometimes occurs that one or the other of the posts of the thermostat will stick in the recess 25 of chuck 24 and to insure the removal of both posts from the chucks of the holders 21 at the same time, I provide a pair of strippers 125 which are in the shape of curved bars (Figs. 1 and 2) secured at their upper ends to converging arms 126 which, in turn, are secured at their upper ends in separated relation centrally of the supporting bar 123. As each carrier passes around the rear end of the machine, the thermostat enters between the strippers 125 which are spaced apart a distance only slightly greater than the thickness of the thermostat, so that as the heads 21 separate, the thermostat will be pulled against one or the other of the strippers 125, causing the post of the thermostat to be separated from the chuck of the holder moving it. The curvature of the strippers 125 conforms in a general way to the curvature of the rack bars 13 and the cam bars 124 at the rear end of the machine, their lower ends terminating under the rear end of the machine and being unconnected so that the thermostats are free to fall between them as their posts are separated from the chucks of the holders, as illustrated in Fig. 1.

The operation is as follows:

The machine being in motion, with the carrier chains 34 causing the carriers to be continuously moved over the machine, the operator standing at the front of the machine, or at the right of the machine as shown in Figs. 1 and 2, places a thermostat between the holders 21 of the carrier, inserting one of the posts thereof in one or the other of the chucks 24, and in the continued movement of the carrier the cam 63 will force the upper ends of the actuating levers 67 inward whereby the pressure plates 73 will engage the heads 16 and force the shafts 8 with their holders 21 inward, the operator guiding the other post of the thermostat into the recess in the other chuck. As the heads 16 pass off of the pressure plates 73, they pass between the pressure bars 61 at opposite sides of the machine and the coil springs 18 in the heads 16 will be maintained under tension, forcing the holders 21 into yielding engagement with opposite sides of the thermostat. As the pinions 9 are in engagement with the rack bars 13, the holders 21 are continuously revolved, riding on the upper side of the guide-plates 84 which hold them sufficiently elevated to permit the wafers to pass over the front end of the acid tank 76, after which the upper surface of these bars is provided with a depression to permit the holders 21 to lower so that the marginal portion of thermostat can enter the acid in tank 76. Upon reaching the rear end of the acid tank, the holders pass up on the curved portions 85 of the guide-plates, thereby again raising the thermostat above the tank and permitting it to pass over into the acid tank into which it descends as the holders pass off of the curved portion 85. It should be stated that the racks 13 are correspondingly curved, as indicated at 13a in Fig. 1, so as to permit the pinions 9 to maintain engagement with the teeth of the rack as the holders are raised and lowered. In passing into the solder tank 77, the thermostat passes between the guide members 86, whereby the thermostat is centered and is caused to straddle the divider 81 which maintains the space between the two units of the thermostat free from solder and thus prevents them from adhering to each other. The marginal portion of the wafers of the thermostat are supplied with solder in passing through the solder tank and at the end thereof, they are raised out of the tank in the manner previously described, and as the carrier passes around the rear end of the machine, the thermostat passes between the strippers 125, the flanges 20 on the heads 16 engage the cam arms 124, and the holders are separated and the wafer allowed to drop from the machine.

After passing out of the solder tank, the wafers of the thermostat are preferably subjected to the action of a blast of air from a pipe 127, whereby the solder thereon is cooled and rapidly hardened.

As heretofore described, each thermostatic unit subjected to the soldering operation in the particular construction of machine here shown comprises two wafers. It will be obvious that the same operations as above described could be carried out with thermostats of a larger size containing three or more wafers, it being only necessary to increase the number of dividers 81 employed and adjust parts where necessary to accommodate the larger size of the unit. It is also apparent that a single wafer could be soldered in the same manner as described with reference to a unit composed of two wafers, in which case, of course, no divider in the solder tank would be necessary. In the vast majority of cases, however, the thermostat is composed of two wafers and the machine illustrated is adapted for soldering such character of thermostats. I wish, therefore, the claims following to be read with this understanding in mind as, for the sake of brevity, I have not sought to distinguish in the claims between soldering a single wafer and soldering the two connected wafers constituting a thermostat, as the operation would be identically the same in each case, except, as stated, that in soldering a single wafer the divider 81 would not be required.

It should also be stated that the machine is adapted for, and I contemplate its use in, soldering other objects than wafers which present a circular extended edge portion. As an illustration of another article which I contemplate soldering in substantially the same way as that described herein in connection with wafers, I may mention drinking fountains for poultry. As the use of my invention in soldering other objects than wafers will, however, in some instances, require modifications in the arrangement and size of the parts of the machine, it is deemed unnecessary to make more than a brief reference to such contemplated applications of the invention as indicating that the generic claims herein submitted are not intended to be limited in scope to the application of the invention to soldering wafers.

In conclusion, it should be stated that in order to get the entire machine on a fairly large scale on a single sheet of drawings, as in Figs. 1 and 2, the machine has been considerably shortened. However, the relative arrangement of parts and the operation of the machine is exactly the same as though the machine had been shown in full length, and said drawings represent the best embodiment of my invention now known to me. I wish it understood, however, that the invention is not limited to the precise details of construction shown, except where such limitations are specifically indicated in certain of the following claims, and various changes in the form, arrangement and construction of parts illustrated could be made without departing from the spirit of my invention.

I claim:

1. A machine for soldering articles having an extended circular edge portion, comprising a series of carriers having separable members for holding the article between them, each of which is provided on its outer end with a circular flange, means for continuously moving the carriers over the machine and simultaneously rotating them, an acid tank and a solder tank located on the upper side of the machine, means for guiding the articles in succession over and through said tanks with the extended edge portion of each immersed a predetermined depth in the acid and solder thereof, respectively, and stationary cam members adapted to be engaged by said flanges for separating the holding members of each carrier after the article has passed out of the solder tank.

2. A machine for soldering articles having an extended circular edge portion, comprising a series of carriers having separable members for holding the article between them, means for continuously moving the carriers over the machine and simultaneously rotating them, an acid tank and a solder tank, means for maintaining a constant depth of acid in said acid tank, means for guiding the articles in succession over and through said tanks with the extended edge portion of each immersed a predetermined depth in the acid and solder thereof, respectively, and automatic means for separating the holding members of each carrier after the article has passed out of the solder tank.

3. A machine for soldering articles having an extended circular edge portion, comprising a series of carriers having separable members for holding the article between them, means for continuously moving the carriers over the machine and simultaneously rotating them, an acid tank and a solder tank, a container for acid in continuous communication with said acid tank, co-operating means for maintaining a constant depth of acid in said tank, means for adjusting the height of said container to regulate the level of acid in said acid tank, means for guiding the articles in succession over and through said tanks with the extended edge portion of each immersed a predetermined depth in the acid and solder thereof, respectively, and automatic means for separating the holding members of each carrier after the article has passed out of the solder tank.

4. A machine for soldering articles having an extended circular edge portion, comprising a series of carriers having separable members for holding the article between them, means for continuously moving the carriers over the machine and simultaneously rotating them, an acid tank and a solder tank, means for simultaneously adjusting the height of said tanks, means for guiding the articles in succession over and through said tanks with the extended edge portion of each immersed a predetermined depth in the acid and solder thereof, respectively, and automatic means for separating the holding members of each carrier after the article has passed out of the solder tank.

5. A machine for soldering wafer-thermostats, comprising a series of carriers having separable members for holding the thermostats between them, means for continuously moving the carriers over the machine and simultaneously rotating them, an acid tank and a solder tank, means for guiding the thermostats in succession over and through said tanks with the extended edge portions of the wafers of each thermostat immersed a predetermined depth in the acid and solder thereof, respectively, means for preventing the solder from adhering to the adjacent sides of two wafers as the thermostats are passed through the solder tank, and automatic means for separating the holding members of each carrier after the thermostat has passed out of the solder tank.

6. A machine for soldering wafer-thermostats, comprising a series of carriers having separable members for holding the thermostat between them, means for continuously moving the carriers over the machine and simultaneously rotating them, an acid tank and a solder tank, means for guiding the thermostats over and through the solder tank and acid tank in succession with the marginal portions of the wafers of the thermostats immersed a predetermined depth in the acid and solder thereof, respectively, a longitudinal strip mounted in the bottom of the acid tank and adapted to be straddled by the wafers of the thermostats as the latter are passed through the solder tank to prevent solder from adhering to adjacent sides of the wafers of the thermostat, and automatic means for separating the holding members of each carrier after the thermostat has passed out of the solder tank.

7. A machine for soldering wafer-thermostats, comprising a series of carriers having separable members for holding the thermostats between them, means for continuously moving the carriers over the machine and simultaneously rotating them, an acid tank and a solder tank, each of said tanks having a central longitudinal raised portion, means for guiding the thermostats over and through said acid and solder tanks in succession with the marginal portions of the wafers of the thermostats riding on said raised portion and immersed a predetermined depth in the acid and solder of said tanks, a longitudinal strip extending centrally of the raised portion of the solder tank and adapted to be straddled by the wafers of the thermostats as they are passed through the tank to prevent solder from adhering to the adjacent sides of the wafers, and automatic means for separating the holding members of each carrier after the thermostat has passed out of the solder tank.

8. A machine for soldering wafer-thermostats, comprising a series of carriers having separable members for holding the thermostat between them, means for continuously moving the carriers over the machine and simultaneously rotating them, an acid tank and a solder tank, means for guiding the thermostats in succession over and through the acid tank and the solder tank in the order named with the marginal portions of the wafers of each thermostat immersed a predetermined depth in the acid and solder thereof, respectively, a longitudinal strip located centrally of the solder tank and adapted to be straddled by the wafers of each thermostat as it is passed through the solder tank to prevent solder from adhering to adjacent sides of the thermostats, means located at the entrance to the solder tank for centering the thermostats as they enter the solder tank to cause them to straddle said strip, and automatic means for separating the holding members of each carrier after the thermostat has passed out of the solder tank.

9. A machine for soldering wafer-thermostats, comprising a series of carriers having separable members for holding the thermostats between them, means for continuously moving the carriers over the machine and simultaneously rotating them, an acid tank and a solder tank, means for guiding the thermostats in succession over and through said tanks with the marginal portions of the wafers of each thermostat immersed a predetermined depth in the acid and solder thereof, respectively, automatic means for separating the holding members of each carrier after the thermostat has passed out of the solder tank, and means for causing each thermostat to be separated from its holding members as the latter are separated.

10. A machine for soldering wafer-thermostats, comprising a series of carriers having separable members for holding the thermostats between them, means for continuously moving the carriers over the machine and simultaneously rotating them, an acid tank and a solder tank, means for guiding the thermostats in succession over and through said tanks with the marginal portions of the wafers of each thermostat immersed a predetermined depth in the acid and solder thereof, respectively, automatic means for separating the holding members of each carrier after the thermostat has passed out of the solder tank, and a pair of stripping members mounted at the rear end of the machine and between which each thermostat is adapted to pass as it leaves the solder tank to cause the thermostat to be released from said holding members as the latter are separated.

11. A machine for soldering wafer-thermostats, comprising a series of transverse carriers having separable members for holding the thermostats between them, means for continuously moving the carriers over the machine and simultaneously rotating them, a head slidably and yieldably mounted on the outer end of each of said carriers, a pressure bar located at each side of the machine and extending longitudinally thereof, automatic means for forcing the members of each carrier inward to cause the holding members thereof to grip a thermostat placed between them and to cause the heads of the carrier to pass between and into engagement with said pressure bars, an acid tank and a solder tank, means for guiding the thermostats in succession over and through said tanks with the marginal portions of the wafers of each thermostat immersed a predetermined depth in the acid and solder thereof, respectively, and automatic means for separating the holding members of each carrier after the thermostat has passed out of the solder tank and the heads of the carrier have passed beyond the rear ends of said pressure bars.

12. A machine for soldering wafer-thermostats, comprising a series of transverse carriers having separable members for holding the thermostats between them, means for continuously moving the carriers over the machine and simultaneously rotating them, a head slidably and yieldably mounted on the outer end of each of said carriers and having a circular flange, a pressure bar located on each side of the machine and extending longitudinally thereof, automatic means for forcing inward the heads of each carrier at a predetermined point in its movement over the machine to cause its holding members to engage a thermostat placed between them and to cause said heads to pass between and into engagement with said pressure bars, an acid tank and a solder tank, means for guiding the thermostats in succession over and through said tanks with the marginal portions of the wafers of each thermostat immersed a predetermined depth in the acid and solder thereof, respectively, a pair of curved diverging cam bars mounted at the rear end of the machine and adapted to be engaged on their outer sides by the flanges of said heads as the latter pass from between said pressure bars, whereby in the continued movement of each carrier to cause the holding members thereof to be separated to release the thermostat.

13. A machine for soldering wafer-thermostats, comprising a series of transverse carriers having separable members for holding the thermostats between them, a pair of endless chains caused to travel in unison longitudinally of the machine and from end to end thereof and to each of which one member of each carrier is secured, a pair of curved rack bars extending about the machine at each side thereof, respectively, from end to end of the machine, a pinion on the movable member of each carrier engaging a corresponding rack bar to cause the rotation of the carriers in their movement over the machine, an acid tank and a solder tank located on the upper side of the machine, means for guiding the articles in the carriers on the upper runs of said chains in succession over and through said tanks with the marginal portions of the wafers of each thermostat immersed a predetermined depth in the acid and solder thereof, respectively, and automatic means for separating the holding members of each carrier after the thermostat has passed out of the solder tank.

14. A machine for soldering wafer-thermostats, comprising a series of transverse carriers having separable members for holding the thermostats between them, a pair of endless chains caused to travel in unison longitudinally of the machine and from end to end thereof and to each of which one member of each carrier is secured, a pair of curved rack bars extending about the machine at each side thereof, respectively, from end to end of the machine, a pinion on the movable member of each carrier engaging a corresponding rack bar to cause the rotation of the carriers in their movement over the machine, an acid tank and a solder tank located on the upper side of the machine, guide bars for supporting the holding members of the carriers and having their upper edges shaped to guide the thermostats in the carriers on the upper runs of said chains in succession over and through said tanks with the marginal portions of the wafers of each thermostat immersed a predetermined depth in the acid and solder thereof, respectively, and automatic means for separating the holding members of each carrier after the thermostat has passed out of the solder tank.

15. A machine for soldering wafer-thermostats, comprising a series of transverse carriers having separable members for holding the thermostats between them, a pair of endless chains caused to travel in unison longitudinally of the machine and from end to end thereof and to each of which one member of each carrier is secured, a pair of continuous rack bars extending about the machine at each side thereof, respectfully, from end to end of the machine, a pinion on the movable member of each carrier engaging a corresponding rack bar to cause the rotation of the carriers in their movement over the machine, an acid tank and a solder tank located on the upper side of the machine, means for guiding the articles in the carriers on the upper runs of said chains in succession over and through said tanks with the marginal portions of the wafers of each thermostat immersed a predetermined depth in the acid and solder thereof, respectively, automatic means for separating the holding members of each carrier after the thermostat has passed out of the solder tank, and means for supporting the separable members of the carrier in their passage under the machine from the rear to the front end thereof and thereby maintain said pinions in engagement with said racks.

16. A machine for soldering wafer-thermostats, comprising a series of transverse carriers having separable members for holding the thermostats between them, each of said members being slidably and rotatably mounted, means for continuously moving the carriers over the machine and simultaneously rotating them, a head slidably and yieldably mounted on the outer end of each of said members, a pressure bar located on each side of the machine and extending longitudinally thereof, a pair of vertically disposed actuating levers pivotally mounted, respectively, at opposite sides of the machine intermediate their ends, the upper end of each of said levers carrying a pressure plate for engaging the heads of said separable members, means for simultaneously separating the lower ends of said actuating levers to cause said pressure plates to force inward the heads of each carrier at a predetermined point in its movement over the machine to cause said separable members to engage a thermostat placed between them and to cause said heads to pass between and into engagement with said pressure bars, an acid tank and a solder tank, means for guiding the thermostats in succession over and through said tanks with the marginal portion of the wafers of each thermostat immersed a predetermined depth in the acid and solder thereof, respectively, and automatic means for separating the holding members of each carrier after the thermostat has passed out of the solder tank and the heads of the carrier have passed beyond the rear ends of said pressure bars.

17. A machine for soldering wafer-thermostats, comprising a series of transverse carriers having separable members for holding the thermostats between them, each of said members being slidably and rotatably mounted, means for continuously moving the carriers over the machine and simultaneously rotating them, a head slidably and yieldably mounted on the outer end of each of said members, a pressure bar located on each side of the machine and extending longitudinally thereof, a pair of vertically disposed actuating levers pivotally mounted, respectively, at opposite sides of the machine intermediate their ends, the upper end of each of said levers carrying a pressure plate for engaging the heads of said separable members, a continuously moving cam adapted to simultaneously engage the lower ends of said actuating levers to force inward the heads of each carrier at a predetermined point in its movement over the machine to cause its holding members to engage a thermostat placed between them, and then to release said lower ends of the actuating levers, means for maintaining engagement of the holding members with the thermostat after the release of the lower ends of the actuating levers by said cam, an acid tank and a solder tank, means for guiding the thermostats in succession over and through said tanks with the marginal portions of the wafers of each thermostat immersed a predetermined depth in the acid and solder thereof, respectively, and automatic means for separating the holding members of each carrier after the thermostat has passed out of the solder tank.

18. A machine for soldering articles having an extended circular edge portion, comprising a series of carriers having separable members for holding the article between them, means for continuously moving the carriers over the machine and simultaneously rotating them, an acid tank and a solder tank, means for simultaneously adjusting the height of said tanks comprising a support on which said tanks are mounted, a pair of bell crank levers each of which has a vertical extension engaging the underside of said support at one end thereof, a manually operable lever, means connecting the opposite ends of said bell crank levers to said manually operable lever, whereby by manipulating said lever the upper ends of said bell crank levers may be raised or lowered to adjust the height of said support and the tanks carried thereby, and means for holding said manually operable lever in adjusted positions.

19. A machine for soldering articles having an extended circular edge portion, comprising a series of carriers having separable members for holding the article between them, means for continuously moving the carriers over the machine and simultaneously rotating them, an acid tank and a solder tank, a container for acid in continuous communication with said acid tank, co-operating means for maintaining a constant depth of acid in said tank, means for adjusting the height of said container to regulate the level of acid in said tank comprising a plate extending transversely of the machine at one side thereof having an outer vertically movable free end portion on which said container is mounted and being secured at its inner end, and an adjusting screw supporting the free end of said plate, means for guiding the articles in succession over and through said tanks with the extended edge portion of each immersed a predetermined depth in the acid and solder thereof, respectively, and automatic means for separating the holding members of each carrier after the article has passed out of the solder tank.

In testimony whereof, I have hereunto set my hand.

JOHN W. MYERS.